(12) United States Patent
Sebeni et al.

(10) Patent No.: US 9,380,535 B2
(45) Date of Patent: *Jun. 28, 2016

(54) METHODS AND APPARATUS FOR ADAPTIVE RECEIVER MODE SELECTION DURING DISCONTINUOUS RECEPTION (71) Applicant: Apple Inc., Cupertino, CA (US)

(72) Inventors: Johnson Sebeni, Fremont, CA (US); Jason Shi, Pleasanton, CA (US); Zhu Ji, San Diego, CA (US); Navid Damji, Cupertino, CA (US); Li Su, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/969,463

(22) Filed: Dec. 15, 2015

(65) Prior Publication Data

US 2016/0100366 A1 Apr. 7, 2016

Related U.S. Application Data

(63) Continuation of application No. 13/631,650, filed on Sep. 28, 2012, now Pat. No. 9,241,311.

(60) Provisional application No. 61/587,092, filed on Jan. 16, 2012.

(51) Int. Cl.
| | |
|---|---|
| *H04L 12/28* | (2006.01) |
| *H04W 52/02* | (2009.01) |
| *H04W 76/04* | (2009.01) |
| *H04W 72/04* | (2009.01) |
| *H04W 28/04* | (2009.01) |

(52) U.S. Cl.
CPC .......... *H04W 52/0235* (2013.01); *H04W 28/04* (2013.01); *H04W 72/042* (2013.01); *H04W 76/048* (2013.01)

(58) Field of Classification Search
CPC .................................................. H04W 76/048
USPC ................................................... 370/328, 325
See application file for complete search history.

(56) References Cited

U.S. PATENT DOCUMENTS

| | | |
|---|---|---|
| 6,678,508 B1 | 1/2004 | Koilpillai et al. |
| 2008/0090606 A1 | 4/2008 | Hwang et al. |

(Continued)

FOREIGN PATENT DOCUMENTS

| | | |
|---|---|---|
| EP | 1422596 A3 | 11/2004 |
| JP | 2003523126 A | 7/2003 |

OTHER PUBLICATIONS

Non-Final Office Action, Japanese Application No. 2014552382, mailed Jun. 26, 2015, 9 pages.
Non-Final Office Action, Korean Application No. 10-2014-7022502, mailed Jul. 17, 2015, 11 pages.

(Continued)

*Primary Examiner* — Mark Rinehart
*Assistant Examiner* — Matthew Hopkins
(74) *Attorney, Agent, or Firm* — Meyertons, Hood, Kivlin, Kowert & Goetzel, P.C.

(57) ABSTRACT

Methods and apparatus for adaptively adjusting receiver operation during non-continuous (e.g., discontinuous) reception. In one exemplary embodiment, a user device such as a User Equipment (UE) adaptively adjusts its reception mode based on a determined actual error. The reception mode is selected so as to improve reception performance, while still minimizing overall power consumption.

20 Claims, 5 Drawing Sheets

(56) References Cited

U.S. PATENT DOCUMENTS

| | | |
|---|---|---|
| 2010/0255835 A1 | 10/2010 | Suzuki et al. |
| 2010/0260121 A1 | 10/2010 | Gholmieh et al. |
| 2010/0330992 A1 | 12/2010 | Bhattacharjee et al. |
| 2010/0331019 A1 | 12/2010 | Bhattacharjee et al. |
| 2012/0120843 A1* | 5/2012 | Anderson ......... H04W 52/0232 370/253 |

OTHER PUBLICATIONS

Non-final Office Action, Taiwan Application No. 102101669, mailed May 27, 2015, 21 pages.

Communication pursuant to Article 94(3) EPC, European Application No. 13708931.4, issued May 11, 2015, 3 pages.

Office Action, Taiwan Patent Application No. 102101669, Sep. 16, 2014.

* cited by examiner

FIG. 5

METHODS AND APPARATUS FOR ADAPTIVE RECEIVER MODE SELECTION DURING DISCONTINUOUS RECEPTION

PRIORITY AND RELATED APPLICATIONS

This application is a continuation of U.S. patent application Ser. No. 13/631,650, entitled "Methods and Apparatus for Adaptive Receiver Mode Selection During Discontinuous Reception", filed Sep. 28, 2012, which claims priority to U.S. Provisional Patent Application Ser. No. 61/587,092 filed Jan. 16, 2012 of the same title, the foregoing being incorporated herein by reference in its entirety.

This application is also related to co-owned, U.S. Provisional Patent Application Serial Nos. 61/585,207 filed on Jan. 10, 2012 and entitled "METHODS AND APPARATUS FOR POWER CONSUMPTION MANAGEMENT DURING DISCONTINUOUS RECEPTION", and 61/585,209 filed on Jan. 10, 2012 and entitled "METHODS AND APPARATUS FOR MANAGING RADIO MEASUREMENTS DURING DISCONTINUOUS RECEPTION", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technical Field

The present disclosure relates generally to the field of wireless communication and data networks. More particularly, in one exemplary embodiment, methods and apparatus for adaptively adjusting receiver operation during non-continuous (e.g., discontinuous) reception are disclosed.

SUMMARY

The present disclosure provides, inter alia, improved apparatus and methods for adaptively adjusting receiver operation during discontinuous reception.

A method for adaptively adjusting receiver operation during discontinuous reception of a mobile device is disclosed. In one embodiment, the method includes: determining a reception performance during a first transmission; adjusting one or more reception modes based on the determined reception performance; receiving one or more subsequent data transmissions via the adjusted one or more reception modes; and updating the reception performance.

A method for adaptively adjusting operation during non-continuous reception (DRX) of a wireless receiver is disclosed. In one embodiment, the wireless receiver has a plurality of modes of DRX operation and where each of the plurality of modes is characterized according to at least a power consumption and a reliability. The method includes: determining a reception performance with a first mode of the plurality of modes of DRX operation during a first transmission; when reception performance is insufficient selecting a second mode of the plurality of modes of DRX operation for a subsequent transmission, the second mode having a greater reliability than the first mode; and updating the reception performance.

In one variant, the reception performance is based on an actual measured error. In another such variant, the reception performance is based on a measured error rate. In still variants, the reception performance is based on physical layer parameters which are indicative of the likelihood of an error occurring.

In another variant, the reception modes include an online and an offline mode. In another variant, the reception modes include one or more antenna diversity schemes. In still other embodiments, the reception modes include an application processing mode and a standalone mode.

In still other variants, the reception modes are further characterized according to one or more power consumptions. In still other variants, the reception modes are additionally characterized according to one or more reliability constraints.

A mobile device having enhanced power management is disclosed. In one embodiment, the mobile device includes two or more processors, one or more wireless interfaces in data communication with the two or more processors, and logic in data communication with the two or more processors and the one or more wireless interfaces, the logic configured to: receive at least one signal over the one or more wireless interfaces determine a reception characteristic of the received at least one signal, and modify an operational mode of the mobile device based at least in part on the reception characteristic.

A computer readable apparatus is disclosed. In one embodiment, the computer readable apparatus includes a plurality of instructions configured to, when executed by a digital processor: determine a reception performance during a first transmission, adjust one or more reception modes based on the determined reception performance, receive one or more subsequent data transmissions via the adjusted one or more reception modes, and update the reception performance.

An integrated circuit (IC) is disclosed. In one embodiment, the integrated circuit comprises logic which is configured to implement adaptively adjustment of receiver operation during discontinuous reception.

A wireless system is disclosed. In one embodiment, the system includes a plurality of base stations and a plurality of mobile user devices. The mobile user devices are configured to adaptively adjust receiver operation during discontinuous reception.

A method of conserving electrical power in a mobile device is disclosed. In one embodiment, the method includes sorting a plurality of operational modes in order of power consumption, operating in a first mode of the plurality of operational modes associated with a first power consumption, checking for an indication of a reception error of a received first transmission, and changing to a second mode of the plurality of operations modes associated with a second power consumption when a reception error is indicated.

Other features and advantages of the disclosed embodiments will immediately be recognized by persons of ordinary skill in the art with reference to the attached drawings and detailed description of exemplary embodiments as given below.

All Figures © Copyright 2012 Apple Inc. All rights reserved.

DETAILED DESCRIPTION

Reference is now made to the drawings, wherein like numerals refer to like parts throughout.

Overview—

So-called Discontinuous Reception (DRX) techniques are widely used within several wireless networking standards (e.g., Universal Mobile Telecommunications System (UMTS), Long Term Evolution (LTE), Wireless Microwave Access (WiMAX), etc.) to reduce power consumption and conserve battery life. During DRX operation, a mobile device such as a user equipment (UE) powers down most of its circuitry for substantial time intervals; the UE powers on according to a DRX cycle which schedules data transmissions over only a brief DRX ON period. By reducing the amount of time that the UE must enable its radio components, DRX operation greatly extends UE standby capabilities (i.e., the amount of time a person can use a device without charging the device's battery).

During typical DRX operation, the UE must periodically power on to receive paging indications, so as to determine if the UE should establish a connection to the network. Existing UE implementations are configured to power on the UE and attempt to decode the paging indications. However, with the advent of new receiver technologies, many devices offer multiple reception modes; these reception modes often have different power consumption and reliability characteristics associated therewith. Consequently, as described in greater detail hereinafter, a user device such as a UE can intelligently determine an appropriate reception mode so as to maximize the likelihood of successful paging reception while also minimizing power consumption.

In one exemplary embodiment, a UE configured in accordance with the determines an appropriate reception mode based on an actual error during a data transmission received from the wireless network. In some variants, a measured error rate may be used in addition to the actual error in determining reception mode. In yet a further variant, physical layer parameters which are predictive of a likelihood of error may also be used in addition to measured error rates in determining reception mode. For example, in one implementation, a User Equipment (UE) may check the Cyclic Redundancy Check (CRC) of a data transmission. If the CRC fails, the reception mode is adjusted to increase reception performance. Similarly, if the CRC passes, the reception mode can be adjusted to decrease power consumption, or alternately be left unchanged. By only requiring the minimum reception mode performance which successfully decodes data transmissions, the UE can optimize power consumption without noticeably affecting performance.

More directly, unlike other data communications procedures, DRX operation does not require significant data throughput, but is primarily concerned with receiving a small message correctly, and then powering off immediately. Thus, while existing receiver selection schemes are based on physical layer parameters which merely indicate the likelihood of successful reception, various disclosed embodiments are directed to adaptive receiver selection based on actual error rates. By basing receiver selection on actual error rates, a UE is much more likely to properly receive DRX transmissions, while still reducing power consumption.

DESCRIPTION OF EXEMPLARY EMBODIMENTS

Exemplary embodiments are now described in detail. While these embodiments are primarily discussed in the context of cellular networks including without limitation, third generation (3G) Universal Mobile Telecommunications System (UMTS) wireless networks, Long Term Evolution (LTE) wireless networks and other fourth generation (4G) or LTE-Advanced (LTE-A) wireless networks, it will be recognized by those of ordinary skill that the present disclosure is not so limited. In fact, the various features disclosed herein are useful in and readily adapted to any wireless network that can benefit from adaptively adjusting receiver operation during discontinuous reception, as described herein.

Methods—

Figure 1:
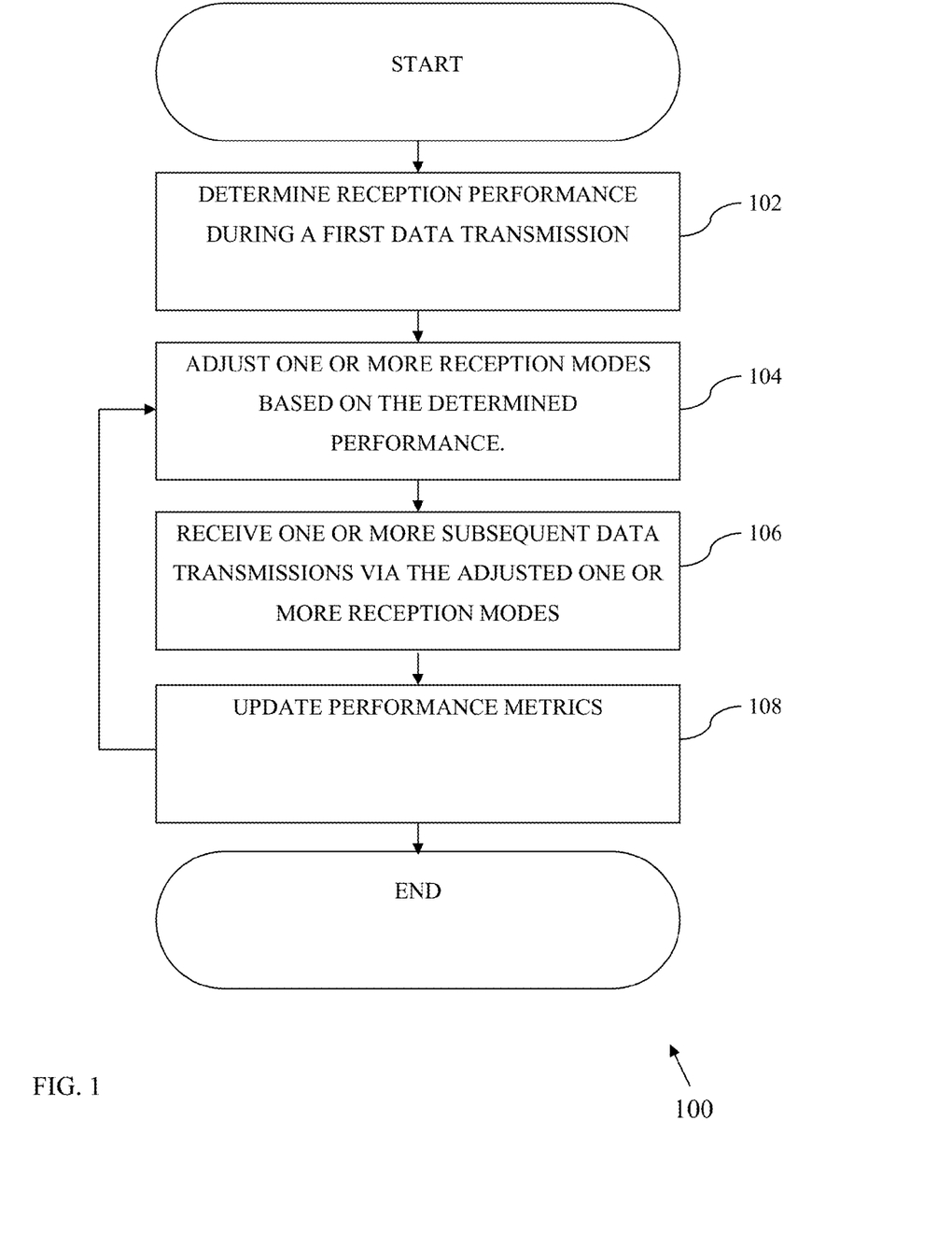
FIG. 1 is a logical flow diagram depicting one embodiment of a generalized method for adaptively adjusting receiver operation during discontinuous reception.

FIG. 1 illustrates one embodiment of a generalized method 100 for adaptively adjusting receiver operation during discontinuous reception. In one exemplary embodiment, the method adjusts a reception mode according to previous (e.g., historical or anecdotal) performance.

Referring to FIG. 1, at step 102 of the method 100, a user device (e.g., UE) determines reception performance during a first data transmission. In one exemplary embodiment, performance is measured as a function of successful (or alternately unsuccessful) decoding of a signal. For example, the UE verifies a Cyclic Redundancy Check (CRC) for each received data transmission.

As described with respect to various embodiments subsequently herein, the terms "successful" and "unsuccessful" as used herein may include without limitation approaches by which one or more events or parameters are graded or assigned a variable or score (e.g., success rate, numerical score, fuzzy logic variable, etc.). For example, in one such case, the decoding of a signal may be successful to varying degrees, or successful on a statistical basis (e.g., to within a desired level of accuracy, or an acceptable number of complete decodings out of a larger number of total attempted decodings). Hence both "binary" (yes/no) and non-binary (e.g., scored) metrics may be used for performance measurement.

As a brief aside, the exemplary CRC performance metric referenced above is an error detecting mechanism for detecting unintentional changes to data. A data block (or any fixed aggregate of data e.g., "packet", "frame", etc.) is appended with a short CRC "check" value; the check value is a mathematical "remainder" generated by executing a polynomial division function on the data contents. When the UE receives the data block and check value, the UE performs a CRC check by executing the same CRC function and comparing the resultant check value to the received check value. If the check values match, then the CRC has "passed" and the data block is presumed unchanged. If the check values differ, then the CRC has "failed" (i.e., the data block has changed).

In one exemplary embodiment, the UE performs a CRC check on various logical channels of a received data transmission. For example, during a DRX cycle, the UE decodes the Physical Downlink Control Channel (PDCCH), and the Physical Downlink Shared Channel (PDSCH). Both the PDCCH and PDSCH are additionally formatted with a CRC check value to ensure safe delivery. Thus, the UE can determine its performance based on the either the PDCCH CRC and/or the PDSCH CRC.

In some variants, the UE may additionally measure and store an error rate which indicates the rate of successful (or unsuccessful) reception of a number of data transmissions. For example, the UE may store a historic sampling of the past CRC value. Other common examples of error rate metrics may include without limitation: Bit Error Rates (BER), Packet Error Rates (PER), Block Error Rates (BLER), etc.

In still other variants, the UE may measure and store physical layer parameters which do not reflect an actual error or error rate, yet are highly predictive of a likelihood of error. Common examples of predictive physical layer parameters include, for example: Reference Signal Received Power (RSRP), Received Signal Strength Indication (RSSI), Signal to Noise Ratio (SNR), timing and/or frequency error, etc.

In one embodiment, the reception performance of the first data transmission immediately affects the reception subsequent thereto. For example, during a DRX cycle the UE decodes the PDCCH, then the PDSCH, and then any subsequent paging messages; thus the UE may use the CRC of the PDCCH or PDSCH to adjust reception mode for the subsequent paging message. In alternate embodiments, the reception performance of the first data transmission is stored for future reference (e.g., so as to improve reception performance during a subsequent Discontinuous Reception (DRX) cycle).

At step 104 of the method 100, the UE adjusts one or more reception modes based on the determined performance. For example, in one embodiment, the reception modes include an "online" and an "offline" mode. During online processing mode the baseband processor processes RF (radio frequency) samples in real time, providing superior decoding reliability during connected mode operation. Specifically, the baseband processor is able to actively track and correct dynamically changing parameters such as: e.g., timing drift, frequency drift, power control, etc. However, online processing consumes significant amounts of power. In contrast, during offline processing, the radio transceiver stores the RF samples, and the baseband processor processes the samples "offline" (at a later time). While offline processing reduces power consumption, the reliability of offline processing is significantly lower since the baseband processor has not corrected for timing errors, frequency error, improper gain control, etc.

In an alternate embodiment, the reception modes include an application processing mode and a standalone mode. During one implementation of such application processing mode, a baseband processor and an applications processor are both enabled. The baseband processor can devote significant processing resources to processing received data transmissions, and the application processor performs other application tasks. For example, the baseband processor is free to increase the Forward Error Correction (FEC) complexity to improve performance e.g., increasing a number of turbo decoding iterations, etc.

During exemplary standalone operation, the applications processor is powered off and all tasks must be performed in the baseband processor. Thus while standalone processing reduces overall power consumption, the baseband processor must "juggle" both applications tasks as well as downlink processing, consequently downlink processing must be simpler and therefore performance will deteriorate.

Moreover, various gradations of the foregoing scheme may be possible. For example, device topologies which include processing elements in addition to an application processor and a baseband processor (e.g., Digital Signal Processor (DSP), programmable logic elements (e.g., Field Programmable Gate Array (FPGA), Programmable Logic Device (PLD), etc.)) may have multiple processing configurations, each having a corresponding power consumption and reception capability.

In another embodiment, the reception modes include antenna diversity schemes. In one variant, the diversity schemes support multiple antennas. For example, a mobile device that has multiple antennas may provide operation in a SISO mode (Single Input, Single Output), a MIMO mode (Multiple Input, Multiple Output), a SIMO (Single Input, Multiple Output), and a MISO mode (Multiple Input, Single Output).

Moreover, it is further recognized that where a device has multiple antennas, the device need only enable a subset of antennas. For example, in a device with three (3) antennas, the device may support modes limited to a single antenna, two (2) of the three (3) antennas, or all of the antennas. In fact, incipient device implementations include four (4) or more antennas, and future devices may only further expand antenna diversity schemes.

In still other embodiments, the reception modes may include support for other wireless networks. Existing devices commonly incorporate Cellular, Wireless Local Area Network (WLAN), Wide Area Network (WAN), and Personal Area Network (PAN), etc. For example, existing devices may support UMTS, LTE, Wi-Fi, WiMAX, and Bluetooth wireless protocols. Concurrent operation of the various ones of the foregoing standards is likely to increase power consumption, and reduce reception performance. Thus, various embodiments may additionally classify the effects of concurrent operation as "reception modes", such classification being used to implement more efficient operation.

In still other embodiments, the reception modes may relate to enabling or disabling various optimizations. For example, as described in co-owned and co-pending U.S. Provisional Patent Application Ser. No. 61/585,207 filed on Jan. 10, 2012, and entitled "METHODS AND APPARATUS FOR POWER CONSUMPTION MANAGEMENT DURING DISCONTINUOUS RECEPTION", previously incorporated by reference in its entirety, the receiver may additionally support various accelerated baseband tracking loop schemes for DRX operation. The accelerated baseband tracking loop schemes are based at least in part on adjusting temporal parameters such as e.g., wake-up times of digital tracking algorithms (such as timing, frequency and power control), based on success/error metrics (e.g., Block Error Rate (BLER), Bit Error Rate (BER), Packet Error Rate (PER), Cyclic Redundancy Checks (CRC), etc.) of one or more previous discontinuous reception (DRX) cycles. Shorter tracking loop times can improve power consumption, but will contribute to larger timing and frequency errors.

Similarly, in co-owned and co-pending U.S. Provisional Patent Application Ser. No. 61/585,209 filed on Jan. 10, 2012 and entitled "METHODS AND APPARATUS FOR MANAGING RADIO MEASUREMENTS DURING DISCONTINUOUS RECEPTION", previously incorporated by reference in its entirety, the receiver may stagger or distribute radio measurements across multiple DRX cycles (which may be contiguous or non-contiguous) so as to reduce the transceiver activity and power consumption. While staggering radio measurements over multiple DRX cycles improves power consumption, the UE will suffer from decreased performance as the radio measurements are more inaccurate.

Moreover, those of ordinary skill in the relevant arts when given the contents of the present disclosure will readily appreciate that reception modes may include various combinations and/or permutations of one or more of the aforementioned modes.

Returning to FIG. 1, at step 106 of the method 100, one or more subsequent data transmissions are received via the adjusted one or more reception modes. In one embodiment, the one or more subsequently received transmissions are received immediately following the first data transmission. Alternately, the one or more subsequent transmissions are received substantially later.

In one exemplary embodiment, the one or more subsequent data transmissions comprise subsequent cycles of a Discontinuous Reception (DRX) cycle. In still other embodiments, the one or more subsequent data transmissions comprise subsequent stages of a DRX cycle (e.g., as described herein, these stages may include iterative attempts to receive a DRX transmission, and/or attempts to receive further information regarding a DRX transmission or page).

At step 108 of the method 100, the UE updates its performance metrics; e.g., after processing the one or more subsequent data transmissions. In one exemplary embodiment, the UE may additionally repeat the foregoing procedure to iteratively improve power consumption. For instance, as shown in FIG. 1, the steps 104, 106 and 108 can be repeated with the updated performance metrics.

Power Consumption and Management in Cellular Networks—

In the following discussion, an exemplary cellular radio system is described that includes a network of radio cells each served by a transmitting station, known as a cell site or base station (BS). The radio network provides wireless communications service for a plurality of user equipment (UE) transceivers. The network of BSs working in collaboration allows for wireless service which is greater than the radio coverage provided by a single serving BS. The individual BSs are connected to a Core Network, which includes additional controllers for resource management and in some cases access to other network systems (such as the Internet, other cellular networks, etc.).

Figure 2:
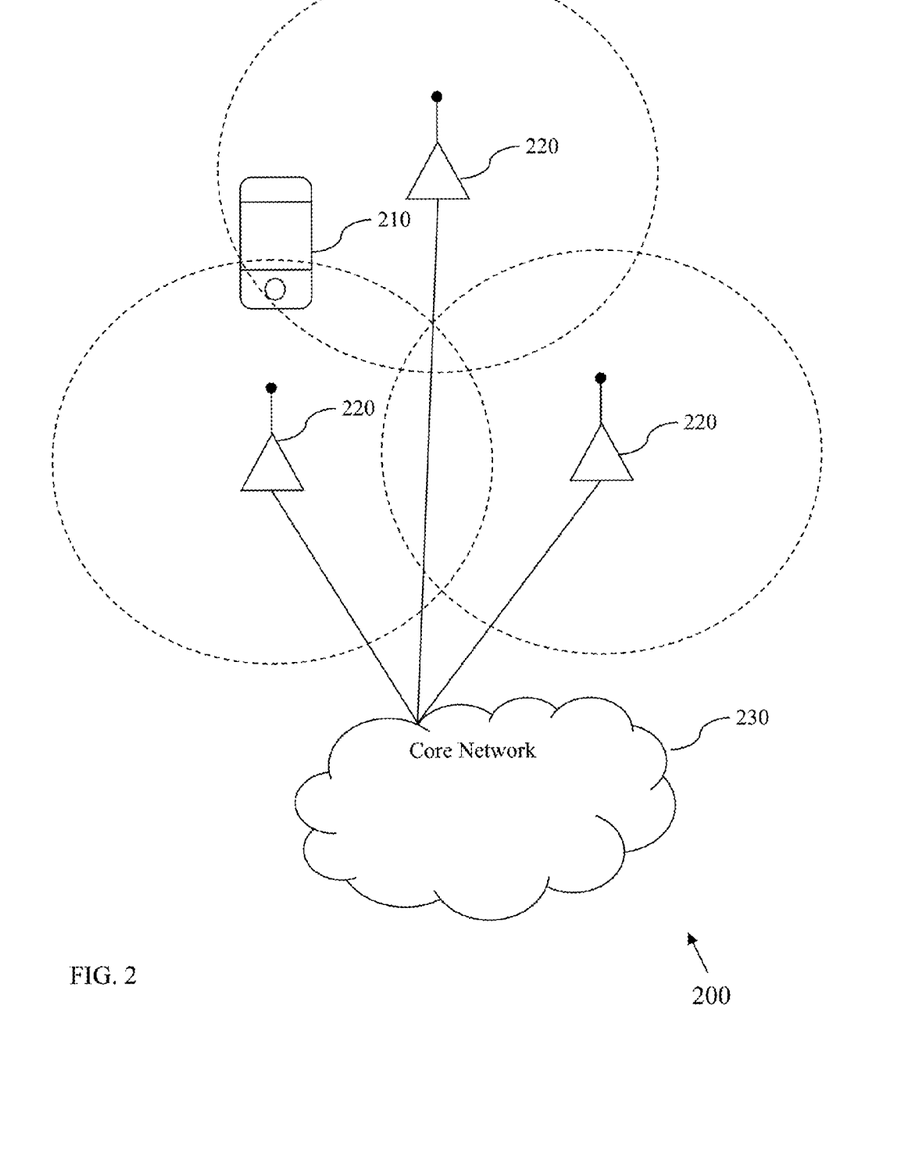
FIG. 2 is a logical block diagram illustrating one exemplary Long Term Evolution (LTE) cellular network useful with various disclosed embodiments.

FIG. 2 illustrates one exemplary Long Term Evolution (LTE) cellular network 200, with user equipment (UEs) 210, operating within the coverage of the Radio Access Network (RAN) provided by a number of base stations (BSs) 220. The LTE base stations are commonly referred to as "Enhanced NodeBs" (eNBs). The Radio Access Network (RAN) is the collective body of eNBs along with the Radio Network Controllers (RNC). The user interfaces to the RAN via the UE, which in many typical usage cases is a cellular phone or smartphone. However, as used herein, the terms "UE", "client device", and "user device" may include, but are not limited to, cellular telephones, smartphones (such as for example an iPhone™ manufactured by the Assignee hereof), personal computers (PCs), such as for example an iMac™, Mac Pro™, Mac Mini™ or MacBook™, and minicomputers, whether desktop, laptop, or otherwise, as well as mobile devices such as handheld computers, PDAs, personal media devices (PMDs), such as for example an iPod™, or any combinations of the foregoing.

Each of the eNBs 220 are directly coupled to the Core Network 230 e.g., via broadband access. Additionally, in some networks the eNBs may coordinate with one another, via secondary access. The Core Network provides both routing and service capabilities. For example, a first UE connected to a first eNB can communicate with a second UE connected to a second eNB, via routing through the Core Network. Similarly, a UE can access other types of services e.g., the Internet, via the Core Network.

As previously described, in order to reduce power consumption and improve the battery life of wireless user equipment (UE), certain wireless technologies implement so-called "Discontinuous Reception" (DRX) and "Discontinuous Transmission" (DTX). During DRX and DTX operation, the UE powers down most of the radio transceiver circuitry when there are no packets to be received or transmitted. The powered down components ("sleep mode") are powered up ("wake-up", "warm-up") at designated time intervals to e.g., receive data from the network ("listening").

DRX can be enabled in different network connection states; these network connection states include when the UE has a radio resource connection (RRC), and when the UE is idle. During connected mode DRX operation, the UE listens to downlink (DL) packets that follow a specific identifying pattern (e.g., packet header, etc.) that has been determined by the base-station (BS). In contrast, during idle mode DRX operation, the UE periodically looks for a paging message from the BS to determine if the UE needs to connect to the network and acquire the uplink (UL) timing. Within the exemplary context of LTE networks, DRX mode operation is specified for two distinct states: (i) RRC_CONNECTED, and (ii) RRC_IDLE. In the RRC_CONNECTED state, DRX mode is enabled during an idle period of the downlink (DL) packet arrival. In the RRC_IDLE state, the UE must be paged for DL traffic (according to a paging schedule) or initiate uplink (UL) traffic by requesting a RRC connection with the serving eNB.

Currently, DRX and DTX techniques are used in several wireless technologies including, for example Universal Mobile Telecommunications System (UMTS), LTE (Long-term Evolution), and WiMAX (Worldwide Interoperability for Microwave Access). Incipient technologies will support very high data rates by using techniques that consume significant amounts of power during operation. Consequently, reducing transceiver use during inactivity will greatly improve overall transceiver power consumption. Existing schemes for DRX are controlled by the BS; i.e., the BS determines the times during DRX transmissions are sent from the BS to the UE.

Recent advances in receiver technologies have produced a wide variety of reception modes. These reception modes largely enable greater and lesser degrees of reception performance, with associated different power consumptions. For example, reception modes generally balance improved reception performance with more power consumption, and vice versa. Generally, reception modes that rely on more processing gain or that increase reception gain (e.g., via more antennas, antenna gain, etc.) consume more power. Generally however, prior art solutions for reception mode selection are based on maximizing receiver performance as a function of data throughput.

Moreover, while minimizing power consumption is critical for UE design, reception performance is directly tied to user experience. Reception performance is greatly impacted by radio conditions, thus poor radio conditions require better reception capabilities, whereas good radio conditions can be adequately handled with less complex more power efficient modes. Existing solutions for receiver adaptation are based on channel quality measures (such as Signal to Noise Ratio (SNR)), which are predictive of performance, but which may require significant fine-tuning to optimize performance.

However, unlike other data communications procedures, DRX operation does not require significant data throughput. Rather, DRX operation is primarily concerned with receiving a small message correctly, and then powering off immediately. Accordingly, ideal solutions for DRX operation should be optimized for power consumption not data throughput. Within this context, methods and apparatus are needed to adaptively adjust reception mode so as to implement the reception mode offering the lowest power consumption which still correctly receives DRX transmissions.

Exemplary Adaptive Receiver Mode Operation—

Accordingly, various embodiments of the present disclosure are directed to measuring actual errors and/or error rates within data transmissions (e.g., data payloads) so as to determine appropriate modes of receiver operation. Specifically, in one exemplary embodiment a scheme for receiver mode selection is disclosed that adaptively adjusts the reception mode for a data transmission based on an actual measured error or error rate within a previous data transmission. For example, a User Equipment (UE) determines a receiver mode for a Discontinuous Reception (DRX) cycle based on a measured error during the previous DRX cycle.

Before addressing the specifics of adaptive receiver mode selection, various components and procedures useful in conjunction with various embodiments of the present disclosure are now discussed in greater detail.

Discontinuous Reception and Transmission (DRX/DTX)—

Figure 3:
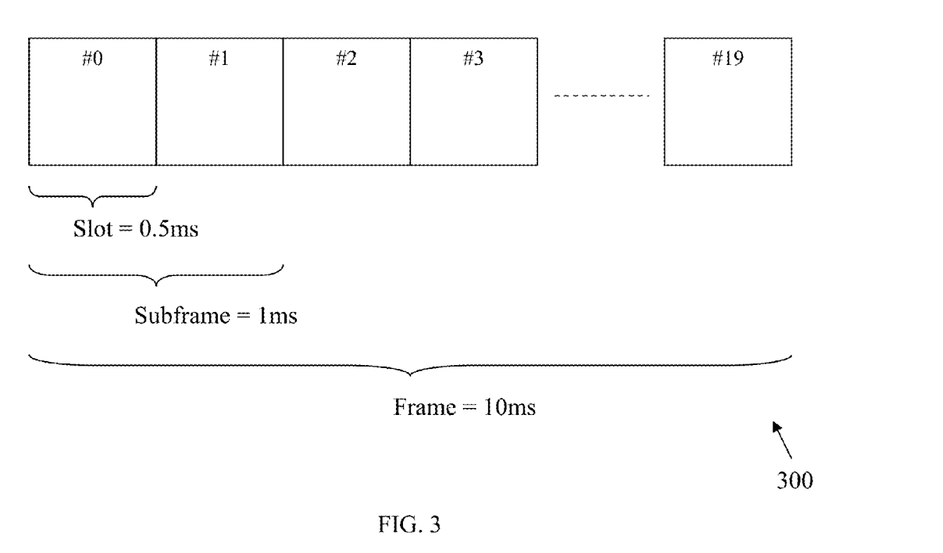
FIG. 3 is a logical block diagram representing one exemplary LTE frame useful with various disclosed embodiments.

The Enhanced NodeB (eNB) controls DRX operations using various timers and/or parameters that are communicated to the user equipment (UE). As a brief aside, LTE communications are conducted according to a time schedule that includes frames, subframes, and slots. One such exemplary LTE frame 300 is illustrated in FIG. 3.

When the UE has a radio resource connection, the UE can be allocated one or more time slots for communication. If a UE is enabled for DRX operation in RRC connected mode, the UE will wake-up and sleep in accordance with its resource allocations. During RRC idle mode, the UE does not have a radio resource connection. The UE will periodically wake-up to see if it is being paged within a frame of data. If the frame does not have a page for the UE, the UE will go back to sleep.

In connected mode DRX (DRX performed during the RRC_CONNECTED state), a DRX inactivity timer indicates the time in number of consecutive subframes to wait before enabling DRX. Additionally, DRX operation is split into short cycles and long cycles. Short DRX cycles and long DRX cycles allow the eNB to adjust the DRX cycles based on ongoing application activity. For example, a UE may initially be placed in a short DRX cycle during brief lulls in activity. A DRX short cycle timer determines when to transition to the long DRX cycle; i.e., if the DRX short cycle timer expires without any UE activity, the UE transitions to the long DRX cycle which further reduces power consumption.

If no new packets are transmitted for an extended period of time after successfully receiving a packet (unsuccessful packet reception indicates a fading/broken connection which is handled with recovery/reconnection procedures), the eNB may release the RRC connection. Once the UE transitions into RRC IDLE state, idle mode DRX is enabled.

In idle mode DRX (DRX performed during the RRC_IDLE state), an ON duration timer determines the number of frames the UE can sleep through before reading the downlink (DL) control channel. Commonly used values for the ON duration timer are 1, 2, 3, 4, 5, 6, 8, 10, 20, 30, 40, 50, 60, 80, 100, and 200. During idle mode DRX, the UE only needs to monitor one paging occasion (PO) per DRX cycle, which is one subframe.

Example Operation—

Figure 4:
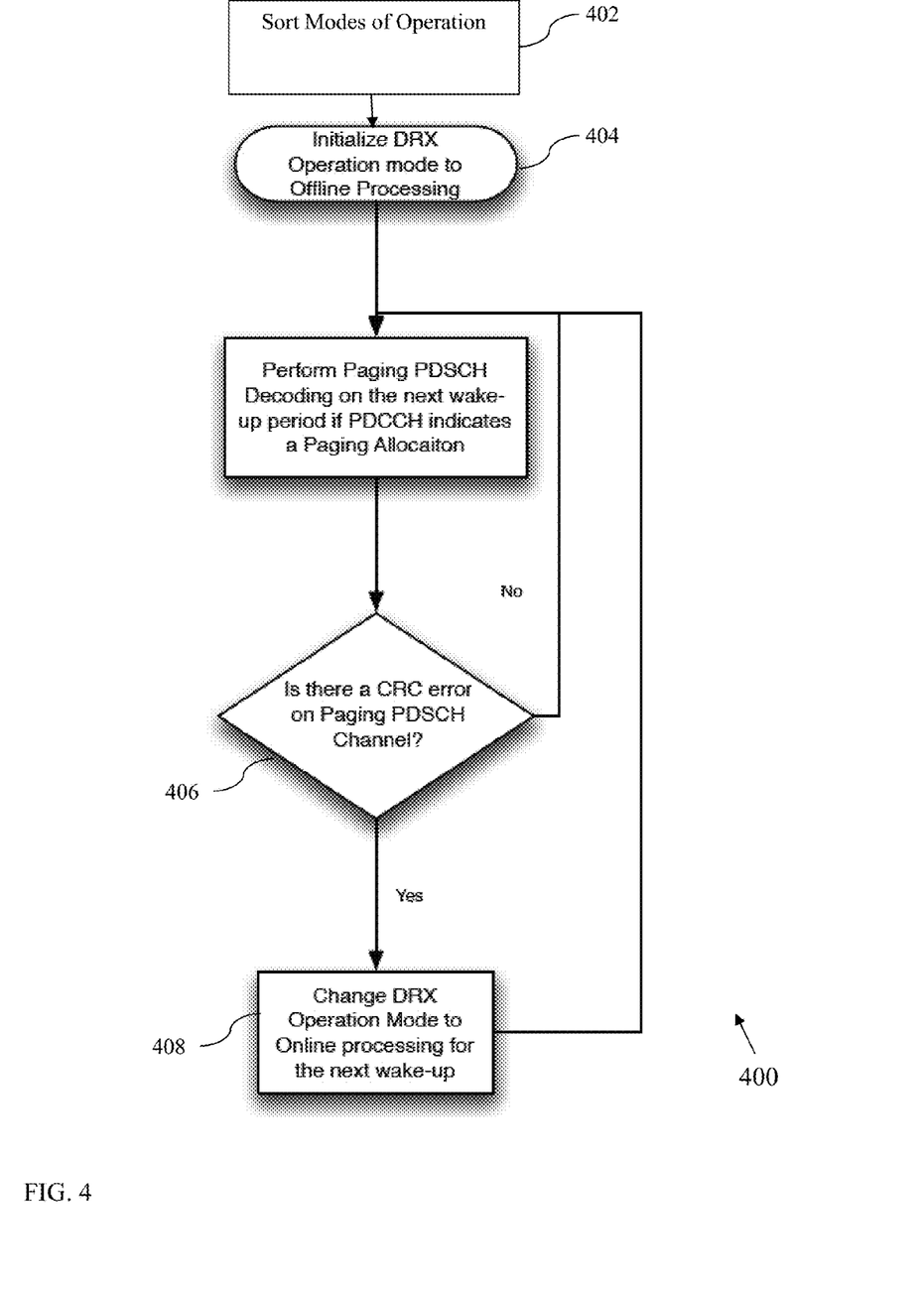
FIG. 4 is a logical flow diagram depicting a first exemplary scheme for adaptively adjusting receiver operation during discontinuous reception.

Referring now to FIG. 4, one exemplary embodiment of a method 400 for adaptively adjusting receiver operation during discontinuous reception is described.

In one exemplary embodiment, the receiver has N modes of operation, where each mode (referenced as "j") is further characterized according to the properties of power consumption (PCj) and reliability (Rj). The reception modes are, in this exemplar, further ordered according to the highest reliability and lowest power consumption (i.e., inefficient reception modes which have low reliability and high power consumption are removed from consideration).

At step 402 of the method 400, the modes of operation are sorted in ascending order of power consumption. This sorting may be performed at e.g., the time of operation, the time of manufacture, the point of distribution, etc. In one exemplary embodiment, the sorting comprises programming an internal memory or data structure with a listing of modes, and their associated characteristics (PCj, Rj). The modes of operation may be are tabulated in a DRX Operational Modes (DOM) listing or other data structure of form.

For example, a user device such as a UE may support two reception modes: e.g., an online mode, and an offline mode. In online processing, the transceiver receives and processes data at the time of receipt which consumes more power and improves reception performance. In offline processing, the transceiver receives and stores data; the data is processed in an offline manner which consumes less power but also decreases reception performance. Other schemes consistent with the principles disclosed herein will be recognized by those of ordinary skill given this disclosure.

At step 404, the UE initializes the DRX Operating Mode (DOM) to the reception mode having the lowest power consumption (in this example, offline processing).

At step 406, at each DRX cycle, the UE checks for an actual error. For example, the UE performs a Cyclic Redundancy Check (CRC) of the Physical Downlink Shared Channel (PDSCH).

If the UE identifies an actual error, the UE increments its current DOM to an online processing mode (which increases reliability, and power consumption) (step 408).

If the UE does not identify an actual error, the UE does not change the current DOM (step 410), and the UE remains in offline processing operation.

Once the DRX cycle has ended, the UE re-initializes its DOM value.

Apparatus—

Figure 5:
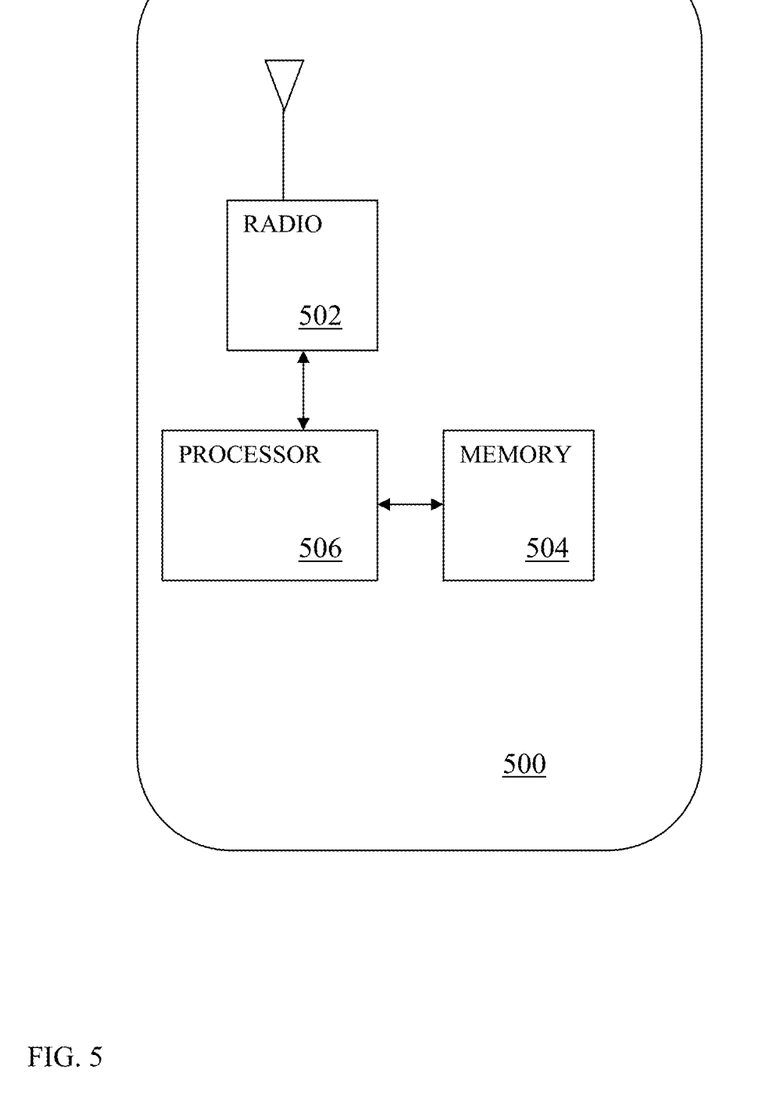
FIG. 5 illustrates an apparatus useful in conjunction with the exemplary methods of FIGS. 1 and 4.

Referring now to FIG. 5, an exemplary user device 500 for adaptively adjusting receiver operation during discontinuous reception is illustrated. As used herein, the term "user device" includes, but is not limited to cellular telephones, smartphones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, wireless-enabled tablet devices, or any combinations of the foregoing. While one specific device configuration and layout is shown and discussed herein, it is recognized that many other configurations may be readily implemented by one of ordinary skill given the present disclosure, the apparatus 500 of FIG. 5 being merely illustrative of the broader principles of discussed herein.

The apparatus 500 of FIG. 5 includes one or more radio transceivers 502, a computer readable memory 504, and a processing subsystem 506.

The processing subsystem 506 includes one or more of central processing units (CPU) or digital processors, such as a microprocessor, digital signal processor, field-programmable gate array, RISC core, or plurality of processing components mounted on one or more substrates. The processing subsystem is coupled to computer readable memory 504, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also comprise additional co-processors, such as a dedicated graphics accelerator, network processor (NP), or audio/video processor. As shown processing subsystem 506 includes discrete components; however, it is understood that in some embodiments they may be consolidated or fashioned in a SoC (system-on-chip) configuration.

The processing subsystem 506 is adapted to receive one or more data streams from an radio transceiver 502. The radio transceiver generally comprises in this exemplary embodiment a cellular radio transceiver. The radio transceiver comprises one or more components having one or more reception modes, each reception mode having a corresponding characteristic power consumption and reliability.

Myriad other schemes for adaptively adjusting receiver operation during discontinuous reception will be recognized by those of ordinary skill given the present disclosure.

It will be recognized that while certain embodiments of the disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from the contents of the disclosure. The foregoing description is of the best mode presently contemplated. This description is in no way meant to be limiting, but rather should be taken as illustrative of the general principles embodied herein. The scope of the present disclosure should be determined with reference to the claims.

What is claimed is:

1. An apparatus, comprising:
one or more processing elements, wherein the one or more processing elements are configured to:
determine a reception performance of a wireless receiver operating in a first mode of a plurality of modes of discontinuous reception (DRX) operation during a first transmission, wherein the plurality of modes of DRX operation includes the first mode and a second mode, wherein the first mode comprises an offline mode, wherein the second mode comprises an online mode, wherein the online mode comprises real-time determination of the reception performance during a connected portion of the DRX operation, and wherein the offline mode comprising storing received data of the first transmission that is analyzed to perform the determination of the reception performance at a later time after the connected portion of the DRX operation; and
when reception performance is insufficient, select the second mode of the plurality of modes of DRX operation for a subsequent transmission, the second mode having a greater reliability than the first mode.

2. The apparatus of claim 1, wherein the determination of reception performance comprises measuring errors of one or more received signals during the first transmission.

3. The apparatus of claim 2, wherein the determination of reception performance further comprises comparing a current measurement of errors of the one or more received signals against one or more previous measurements of errors.

4. The apparatus of claim 1, where selecting the second mode comprises adjusting the operation of one or more processing elements.

5. The apparatus of claim 1, wherein said determining the reception performance is performed for a PDCCH and/or a PDSCH channel during a first DRX cycle, wherein the second mode is selected for a page of the first DRX cycle.

6. The apparatus of claim 1, wherein the offline mode is configured to consume less power than the online mode.

7. The apparatus of claim 1, where selecting the second mode comprises at least adjusting an antenna diversity scheme operation of the wireless receiver.

8. A mobile device having enhanced power management, the mobile device comprising:
one or more antennas; and
one or more processors coupled to the one or more antennas, wherein the one or more processor are configured to operate with the one or more antennas to:
receive at least one signal using the one or more antennas;
determine a reception characteristic of the received at least one signal; and
modify an operational mode of the mobile device based at least in part on the reception characteristic, wherein modifying the operational mode comprises switching from using an offline discontinuous reception (DRX) mode to using an online DRX mode, wherein the online DRX mode comprises real-time determination of reception performance during a connected portion of the DRX operation, and wherein the offline DRX mode comprising storing received data of the connected portion of the DRX operation that is analyzed to perform the determination of the reception performance at a later time after the connected portion of the DRX operation.

9. The mobile device of claim 8, wherein the mobile device comprises a plurality of processors, wherein modifying the operation mode comprises enabling or disabling one of the plurality of processors.

10. The mobile device of claim 9, wherein the one processor is disabled when the determined reception characteristic is under a threshold, otherwise the one processor is enabled.

11. The mobile device of claim 8, wherein the at least one signal is comprised in a PDCCH and/or a PDSCH channel during a first DRX cycle, wherein the one or more processors are further configured to:
receive a page during the first DRX cycle using the online DRX mode.

12. The mobile device of claim 8, wherein the determined reception characteristic comprises information relating to reception error of the received at least one signal.

13. The mobile device of claim 12, wherein the determination of reception characteristic further comprises comparing a current measurement of errors of the received at least one signal against one or more previous measurements of errors.

14. The mobile device of claim 8, wherein the one or more processors are further configured to:

receive one or more subsequent signals using the one or more antennas; and update the reception characteristic based at least on part on the received one or more subsequent signals.

15. The mobile device of claim 8, wherein the operational modes comprise adjusting adaptive diversity operation of the one or more antennas.

16. A non-transitory computer readable memory medium storing a plurality of instructions executable by a processor of a mobile device to:

sort a plurality of discontinuous reception (DRX) modes in order of power consumption, wherein the plurality of operational modes includes a first mode and a second mode, wherein the first mode comprises an offline mode, wherein the second mode comprises an online mode, wherein the online mode comprises real-time determination of the reception performance during a connected portion of the DRX operation, and wherein the offline mode comprising storing data received during a connected portion of the DRX operation that is analyzed to perform the determination of the reception performance at a later time after the connected portion of the DRX operation;

operating in the first mode of the plurality of DRX modes associated with a first power consumption;

checking for an indication of a reception error of a received first transmission; and changing to the second mode of the plurality of DRX modes associated with a second power consumption when a reception error is indicated.

17. The non-transitory computer readable memory medium of claim 16, wherein the second mode is determined based at least in part on a magnitude of the reception error indicated.

18. The non-transitory computer readable memory medium of claim 17, wherein the second mode consumes more power than the first mode.

19. The non-transitory computer readable memory medium of claim 17, wherein the mobile device comprises at least two processing elements; and wherein first mode disables at least one of the processing elements.

20. The non-transitory computer readable memory medium of claim 19, wherein the second mode enables the at least one disabled processing element.

\* \* \* \* \*